United States Patent
Nijor et al.

(10) Patent No.: US 10,289,615 B2
(45) Date of Patent: May 14, 2019

(54) NATURAL LANGUAGE QUERY RESOLUTION FOR HIGH DIMENSIONALITY DATA

(71) Applicant: OpenGov, Inc., Redwood City, CA (US)

(72) Inventors: Gurdas Nijor, Redwood City, CA (US); Andrew Clark, Redwood City, CA (US)

(73) Assignee: OpenGov, Inc., Redwood City, CA (US)

( * ) Notice: Subject to any disclaimer, the term of this patent is extended or adjusted under 35 U.S.C. 154(b) by 163 days.

(21) Appl. No.: 15/609,528

(22) Filed: May 31, 2017

(65) Prior Publication Data

US 2018/0329948 A1     Nov. 15, 2018

Related U.S. Application Data

(60) Provisional application No. 62/506,335, filed on May 15, 2017.

(51) Int. Cl.
| | | |
|---|---|---|
| G06F 16/00 | (2019.01) | |
| G06F 16/242 | (2019.01) | |
| G06F 16/248 | (2019.01) | |

(52) U.S. Cl.
CPC .......... G06F 16/243 (2019.01); G06F 16/248 (2019.01)

(58) Field of Classification Search
CPC ............. G06F 17/30401; G06F 16/243; G06F 16/248; G06F 17/30554
See application file for complete search history.

(56) References Cited

U.S. PATENT DOCUMENTS

| | | | | |
|---|---|---|---|---|
| 2011/0047169 A1* | 2/2011 | Leighton | ........... | G06F 17/30675 707/756 |
| 2011/0320187 A1* | 12/2011 | Motik | .................... | G06F 17/278 704/9 |
| 2012/0010872 A1* | 1/2012 | Zuev | .................... | G06F 17/2755 704/9 |
| 2012/0078889 A1* | 3/2012 | Chu-Carroll | ...... | G06F 17/30654 707/723 |
| 2012/0265773 A1* | 10/2012 | McGlashan | ....... | G06F 17/30398 707/754 |
| 2014/0149446 A1* | 5/2014 | Kuchmann-Beauger | ..................... | G06F 17/30389 707/763 |
| 2017/0199928 A1* | 7/2017 | Zhao | ....................... | G06F 17/11 |
| 2017/0270159 A1* | 9/2017 | Wang | ................ | G06F 17/30401 |
| 2018/0144065 A1* | 5/2018 | Yellai | ................ | G06F 17/30401 |

* cited by examiner

*Primary Examiner* — Leslie Wong

(74) *Attorney, Agent, or Firm* — Patterson + Sheridan, LLP

(57) ABSTRACT

Techniques are disclosed herein for resolving a natural language query. Input (e.g., text input, audio input) corresponding to a query requesting data is received. A type of the query is determined based on a natural language analysis on the query. A form of response to the query is identified based on the type of the query. A visualization associated with the form of response is identified. The visualization is presented via a user interface. The presented visualization includes the requested data.

15 Claims, 6 Drawing Sheets

NATURAL LANGUAGE QUERY RESOLUTION FOR HIGH DIMENSIONALITY DATA

CROSS-REFERENCE TO RELATED APPLICATIONS

This application claims benefit of U.S. Provisional Patent Application Ser. No. 62/506,335, filed May 15, 2017, of which is incorporated herein by reference in its entirety.

BACKGROUND

Field

Embodiments presented herein generally relate to natural language processing, and more specifically, to identifying a query type and form of response corresponding to an input query.

Description of the Related Art

Open data, the concept of making certain data freely available to the public, is of growing importance. For example, demand for government transparency is increasing, and in response, governmental entities are releasing a variety of data to the public. One example relates to financial transparency for governmental entities (e.g., a city or other municipality) making budgets and other finances available through data accessible to the public. Doing so allows for more effective public oversight. For example, a user may analyze the budget of a city to determine how much the city is spending for particular departments and programs. This is particularly useful for a department head at one city who wants to evaluate spending trends within the department and allocate resources accordingly.

An issue that arises in providing public access to this kind of financial data is presenting the data in a useful manner. For instance, in the previous example, budgetary data for a given city government is often voluminous. Consequently, users accessing the data may have difficulty retrieving information specific to their needs. To address such an issue, computer applications may parse and process the budgetary data in a manner that is presentable to a user (e.g., by generating graphs, charts, and other data analytics). An example application may provide a graphical user interface that allows a user to traverse various menus to obtain data for one or more departments, such as spending in a particular department, or revenues in equivalent departments across multiple municipal governments. However, because of the complexity of the budgetary data, navigating through the user interface to retrieve the desired data can become cumbersome for the user.

SUMMARY

One embodiment presented herein discloses a method for resolving a natural language query. The method generally includes receiving, by execution of one or more processors, audio input corresponding to a query requesting data from at least one of a plurality of hierarchies. A type of query is determined based on a natural language analysis on the query. A form of response to the query is identified based on the type of the query. A visualization associated with the form of response is identified. The visualization associated with the form of response is presented via a user interface. The presented visualization includes the requested data from the at least one of the plurality of hierarchies.

Another embodiment presented herein discloses a computer-readable storage medium storing instructions, which, when executed on a processor, performs an operation for resolving a natural language query. The operation itself generally includes receiving, by execution of one or more processors, audio input corresponding to a query requesting data from at least one of a plurality of hierarchies. A type of query is determined based on a natural language analysis on the query. A form of response to the query is identified based on the type of the query. A visualization associated with the form of response is identified. The visualization associated with the form of response is presented via a user interface. The presented visualization includes the requested data from the at least one of the plurality of hierarchies.

Yet another embodiment presented herein discloses a system. The system has a processor and a memory. The memory stores program code, which, when executed on the processor, performs an operation for resolving a natural language query. The operation itself generally includes receiving, by execution of one or more processors, audio input corresponding to a query requesting data from at least one of a plurality of hierarchies. A type of query is determined based on a natural language analysis on the query. A form of response to the query is identified based on the type of the query. A visualization associated with the form of response is identified. The visualization associated with the form of response is presented via a user interface. The presented visualization includes the requested data from the at least one of the plurality of hierarchies.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
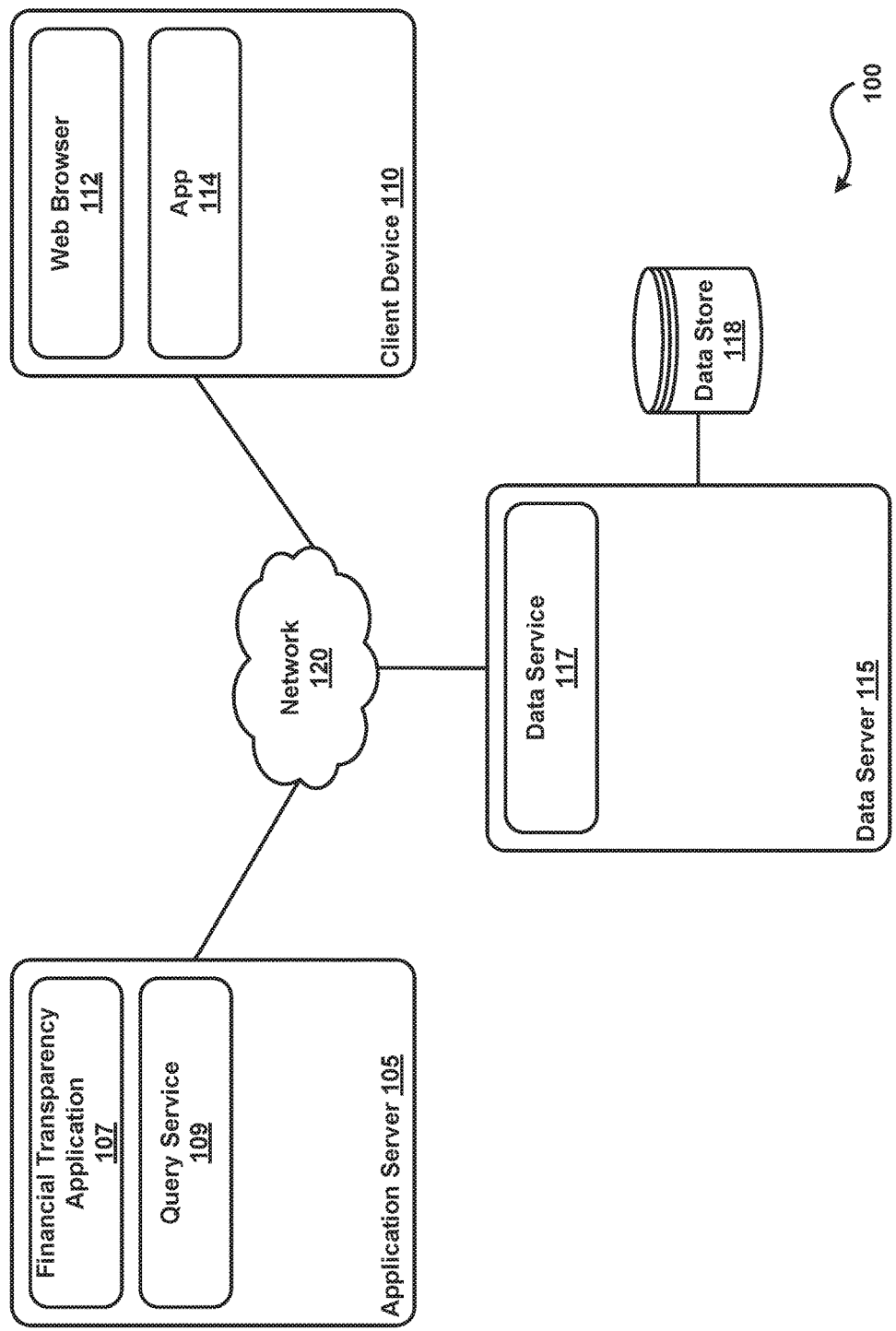
FIG. 1 illustrates an example computing environment, according to one embodiment.

Complex data models can provide useful insights to a user. However, current approaches to accessing the underlying data are often cumbersome and require a fair amount of context, e.g., navigating through different facets of the data via user interface menus until the desired data is accessible in a presentable format. Leveraging natural language facilities may allow desired information in the complex data to be more easily accessed.

Embodiments presented herein disclose techniques for resolving user queries, e.g., queries received as input (e.g., text input, audio input, etc.) via a mobile application. More specifically, the techniques provide an approach to evaluate, via natural language processing (NLP), a given query requesting data, such as data from one or more hierarchies. Generally, a response to such a request should be presented according to the type of query. For example, if the query is requesting data for a specific time period, then the data should be presented in a time series format. As another example, if the query is requesting data from two distinct hierarchies, then the response should present the data for each hierarchy in comparison with one another. The techniques provide an approach for identifying the query type and obtaining the requested data. Further, this approach identifies a visualization responsive to the query type for presenting the data to the user.

For example, embodiments presented herein may be adapted as a query service executing on an application server. For instance, the application server may provide a financial transparency application that processes publicly available budgetary data of municipal governments (e.g., by scraping external sources, such as charts of accounts of those municipal governments). The financial transparency application presents budgetary data of municipal governments to a user, e.g., via a web-based service providing a graphical user interface. Such a service may be accessible via a client web browser or on a mobile app executing on a client device. The financial transparency application may display visualizations of the requested data in various formats, such as time series graphs, bar graphs, pie charts, and the like.

In one embodiment, the financial transparency application includes a natural language query service that processes queries, such as audio-based queries received from a client device. The natural language query service may evaluate an underlying query using a heuristics-based NLP approach to identify a type of the query and determine a mapping to a suitable visualization responsive to that query type. For example, the query service may generate, from a query, a syntax parse tree representing a lexicographical structure of the query. The syntax parse tree separates the query into grammatical components, such as subjects, objects, operators, modifiers, and the like. The query service identifies relationships between the components and classifies the components to determine a type of the query. The query service then identifies a proper response format based on the type. Once determined, the query service matches the query against the underlying data to retrieve the requested data. The query service may then determine the cardinality of the resulting data to determine the response type, such as a time series graph or a time series chart. The financial transparency application then presents the visualization of the data using the appropriate response type.

Advantageously, the approach disclosed herein leverages natural language-based techniques to facilitate queries for complex data, such as large amounts of hierarchically-related data, in a user interface. In particular, this approach reduces the amount of learning required to use an underlying application providing such data to a user. Therefore, users of varying skills may access the data provided by the application with a minimum amount of training. Rather than navigating through various menus, a user may instead provide a natural language query requesting the desired data. In response, the application processes the query and determines an appropriate visualization to provide in response to the query.

Note, the following uses a financial transparency application that processes budgetary data of municipal governments as a reference example of resolving audio-based queries to provide an appropriate visualization to a user interface in response to the query. Of course, one of skill in the art will recognize that embodiments disclosed herein may be adapted to a variety of complex data. For example, a query service may process audio input-based queries on requests for data associated with departments of a business organization (e.g., data corresponding to spending, units of production, employee growth, etc.) and select an appropriate response format based on the underlying query.

FIG. 1 illustrates an example computing environment 100, according to one embodiment. As shown, the computing environment 100 includes an application server 105, a client device 110, and a data server 115, each interconnected via a network 120 (e.g., the Internet, a local area network, enterprise network, etc.). In one embodiment, each of the application server 105, client device 110, and data server 115 are representative of a physical computing system (e.g., a desktop computer, laptop computer, mobile device, workstation, etc.) or a virtual computing instance executing in the cloud. In a particular embodiment, the client device 110 represents a mobile device (e.g., a smart phone, tablet computer). Further, although FIG. 1 depicts the configuration of software components as executing on separate servers, the components may all reside on one system (e.g., as a single application, as multiple applications, etc.).

As shown, the application server 105 includes a financial transparency application 107 and a query service 109. In one embodiment, the financial transparency application 107 provides a software platform that allows a user to evaluate financial and budgetary data for municipal governments. For example, the financial transparency application 107 may provide a graphical user interface through a web portal (not shown) that is accessible by a user (such as an administrator, city planner, citizen), e.g., via a web browser 112 executing on the client device 110. The user may also access the financial transparency application 107 via a mobile app 114 that serves as a skin over the web interface. The budgetary data itself may be scraped from public sources (e.g., charts of accounts, websites of city governments, online encyclopedias, etc.) and processed.

Further, the financial transparency application 107 may identify hierarchies in the retrieved data, such as departmental information, account information associated with each department, relationships between departments and funds, and the like. The financial transparency application 107 may transmit the processed hierarchical data to a data service 117 executing on the data server 115. The data service 112 may maintain the budgetary data in a data store 118. For example, the data may be formatted in a markup language file (e.g., XML, JSON, etc.) or as spreadsheet data.

In one embodiment, the financial transparency application 107 presents visualizations of the budgetary data that are responsive to a request from the client device 110. For instance, the financial transparency application 107 may generate a time series graph of revenues earned by a particular department for a given time period. As another example, the financial transparency application 107 may present a comparison bar graph of departments belonging to different municipal governments. At yet another example, the financial transparency application 107 may present a total value representing an aggregate amount of an encompassing fund.

As stated, the client device 110 includes an app 114 that provides an interface for accessing the financial transparency application 107. In addition to providing a skin for the web interface of the financial transparency application 107, the app 114 may include additional user interface features. For example, the app 114 may be configured to receive audio input from a user corresponding to a natural language query. To do so, the app 114 may use application programming interfaces (API) used to control a microphone of the client device 110 and obtain audio input from the microphone. The app 114 may convert the audio input to text and transmit the converted input to the financial transparency application 107 for further processing. Alternatively, the app 114 may send the audio input directly to the financial transparency application 107.

In one embodiment, the financial transparency application 107 may resolve queries sent by the client device 110 via a natural language query service 109. As further described below, the query service 109 obtains the audio input corresponding to a query (or the converted text query) and applies natural language processing (NLP) techniques to resolve the query. In one embodiment, the query service 109 generates a syntax parse tree from the query and uses the syntax parse tree to determine a mapping of the natural language query to a query that is understandable to the software platform. Doing so allows the query service 109 to also perform a cardinality analysis on the data being returned as a result of the query, which may then be used to determine a form of response for the query, such as the type of visualization needed to present the cardinality of the data to the requesting client.

The query service 109 is configured to communicate with the data service 117 to perform database queries (e.g., an SQL query) to retrieve requested data. In one embodiment, the query service 109 is a separate application from the financial transparency application 107. However, in some configurations, the query service 109 may be included as a module of the financial transparency application 107.

Figure 2:
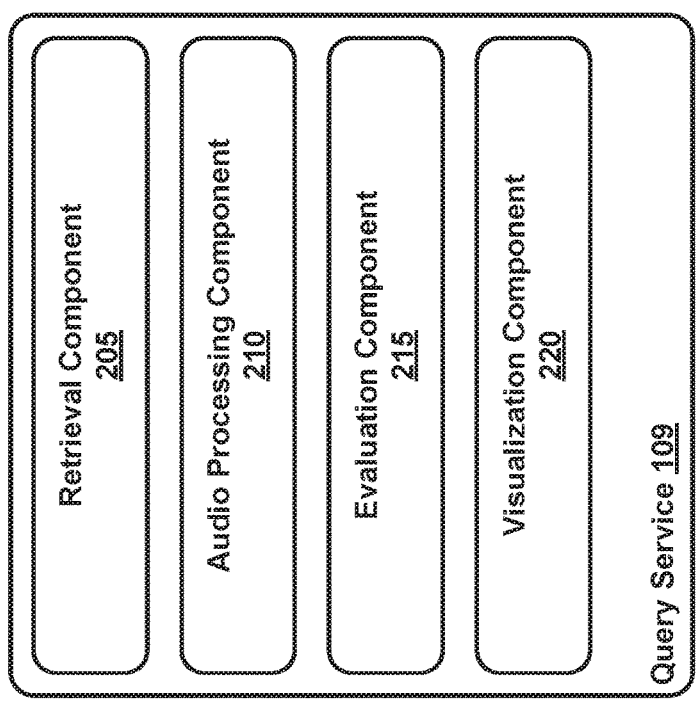
FIG. 2 further illustrates the query service described relative to FIG. 1, according to one embodiment.

FIG. 2 further illustrates the query service 109, according to one embodiment. In particular, FIG. 2 presents a conceptual diagram of the process steps performed by the query service 109. One of skill in the art will recognize that the actual allocation of process steps in practice may vary substantially from this illustration. As shown, the query service 109 includes a retrieval component 205, an audio processing component 210, an evaluation component 215, and a visualization component 220.

The retrieval component 205 obtains audio input sent from the app 114. The audio input corresponds to a natural language query sent from a client device 110 accessing the financial transparency application 107, such as "Show me the departments under General Funds for City X," "How much did the Water Treatment department spend over the last two years," "What is the distribution of the General Funds for the year 2015." Further, the audio input may also be originally obtained from the financial transparency application 107 and transmitted to the retrieval component 205. In some embodiments, the retrieval component 205 may obtain a text input (e.g., speech-to-text formatted input). In the case that the retrieval component 205 obtains audio input, the audio processing component 210 may convert the audio input to text using various speech-to-text techniques.

The evaluation component 215 converts the natural language query to a query understandable by the financial transparency application, e.g., a SQL query. In one embodiment, the evaluation component 215 generates a syntax parse tree from the natural language query. The syntax parse tree provides a lexicographical structure of the query. In particular, the syntax parse tree separates the query into its grammatical components, such as operators, modifiers, subjects, etc. In generating the syntax parse tree, the evaluation component 215 assigns each component part-of-speech tags identifying the component as an operator, modifier, subject, and so on.

Further, the evaluation component 215 uses the syntax parse tree to analyze the sentence structure of the natural language query. Doing so allows the evaluation component 215 to identify relationships between the components. For example, given a natural language input of "Show me the amount of overtime spending in the past five years, broken down by Departments and Divisions," the resulting syntax parse tree may identify components such as "past five years" to be indicative of a time series query. Further still, the evaluation component 215 identifies relationships between the components, which indicate how the machine-readable query should be formed. Continuing the example, the evaluation component 215 may identify "Departments" and "Divisions" as target objects for the data being retrieved. The evaluation component 215 may also identify "past five years" as a modifier to the object "amount."

Based on the identified relationships, the evaluation component 215 may formulate a database query. To do so, the evaluation component 215 may identify mappings to database components of the data service 117. For instance, the evaluation component 215 may convert the above example natural language query to "SELECT department_name, department_division_name, year, SUM(amount) FROM financial_transactions LEFT OUTER JOIN department_hierarchy ON department_code, LEFT OUTER JOIN exp_rev_ledger_hierarchy ON ledger_code WHERE ledger_code_type='expenses' AND ledger_summary_name='Overtime' AND year>=2011 GROUP BY department_name, department_division_name, year;".

The query service 109 executes the query, which results in the data service 117 returning a result set in response to the query. The evaluation component 215 may then determine, based on the result, a cardinality of the resulting data. The visualization component 220 may then select, from the cardinality of the resulting data, the type of visualization that should be used to present the data. For instance, visualization component 220 performs heuristics to determine the shape of the underlying SQL query to inform the determination. As another example, the visualization component 220 may identify a mapping from a given query type (e.g., a time series query, aggregate query, comparison query, etc.) to a particular visualization. Given the above example, the visualization component 220 may identify that the data should be displayed in separate time series graphs by department and division. The visualization component 220 may then generate the time series graphs and display the requested data accordingly.

Figure 3:
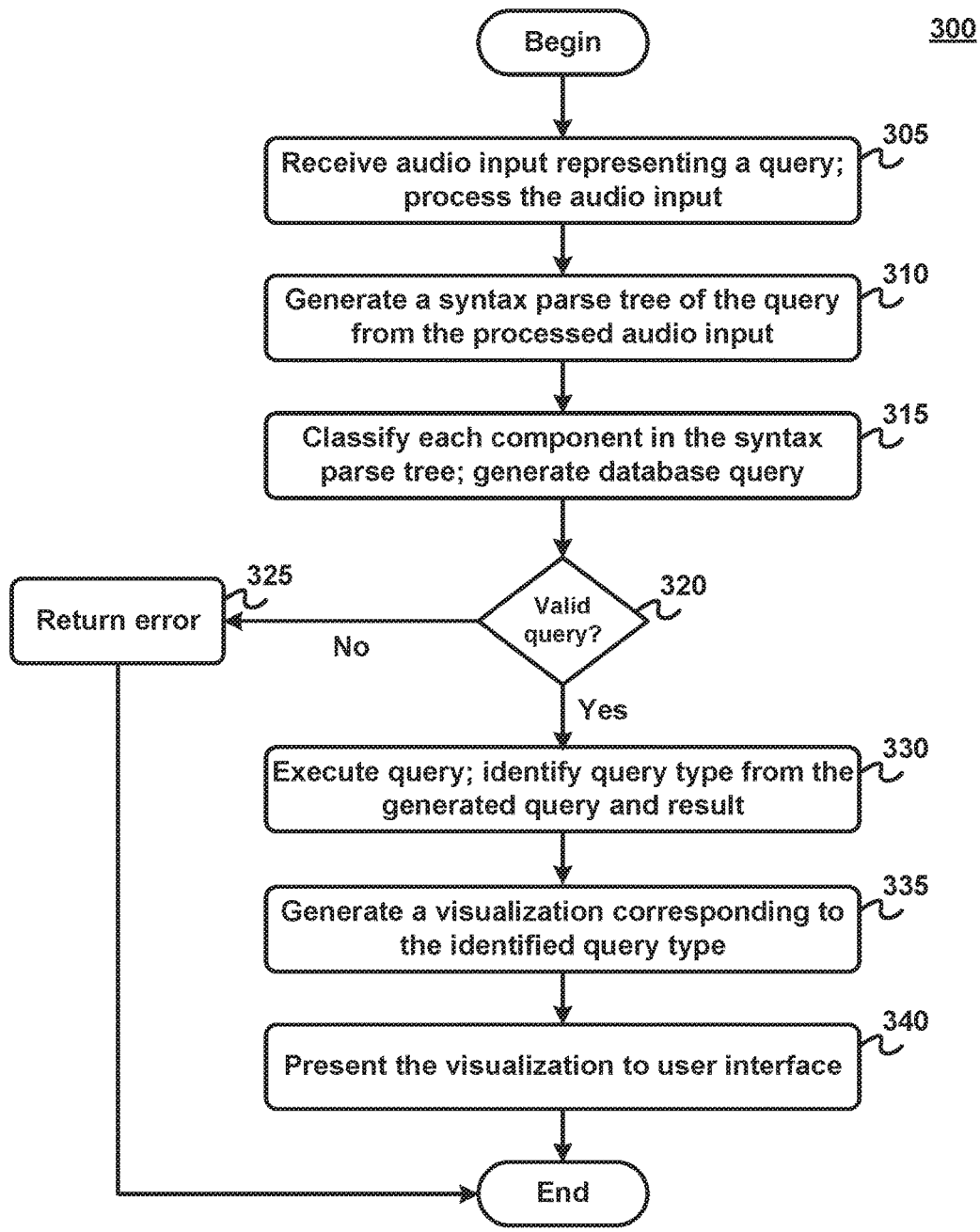
FIG. 3 illustrates a method for resolving a query received as audio input, according to one embodiment.

FIG. 3 illustrates a method 300 for resolving a query received as audio input, according to one embodiment. As shown, the method 300 begins at step 305, where the retrieval component 205 obtains audio input corresponding to a natural language query from the app 114. For example, a user, via the user interface provided by the financial transparency application 107 to the app 114, may create a natural language query using audio input features of the client device 110. The app 114 then sends the audio input to the query service 109. Further, the audio processing component 210 converts the audio input to corresponding text input, e.g., using speech-to-text conversion techniques.

At step 310, the evaluation component 215 generates a syntax parse tree from the underlying natural language query. To do so, the evaluation component 215 may perform natural language parsing techniques to determine the grammatical structure of the input query. For example, the evaluation component 215 may input the underlying text query to a probabilistic natural language parser to do so. The resulting syntax parse tree separates the query into grammatical components (e.g., modifiers, operators, subjects, objects, etc.).

At step 315, the evaluation component 215 classifies each component in the syntax parse tree. The evaluation component 215 can base classifications on identified relationships between each of the components, such as the effect of a modifier on a particular object. Further, the evaluation component 215 may evaluate parts-of-speech tags associated with each component and identify a mapping to a database component based on the classification. The evaluation component 215 then generates, from the mappings, a database query corresponding to the natural language query.

At step 320, the evaluation component 215 ensures that the generated database query corresponds to a valid query. For example, the evaluation component 215 may determine whether the requested data exists in the data store 118, or whether dates provided in the query correspond to workable dates. If the database query does not correspond to a valid query, then the query service 109 may return an error to the app 114. The app 114 may display the error via the user interface.

Otherwise, at step 330, the evaluation component 215 executes the query with the data service 112. In turn, the data service 112 returns a set of data responsive to the query. The evaluation component 215 may then determine a cardinality of the returned set of data to determine how to present the data to the user interface of the app 114. For example, the visualization component 220 identifies a query type associated with the generated query and result, such as whether the query is requesting time series information, comparison information between two hierarchical data sets, an aggregate of data, and the like. The evaluation component 215 may determine, based on the query type, a form of response and visualization to return to the user. Further, the visualization component 220 may apply heuristics on the query type and the shape of the query itself to determine the form of response to provide as a result of the request.

Once determined, the visualization component 220 may communicate the selection of a visualization to the financial transparency application 107. In turn, the financial transparency application 107 may generate the selected visualization and present the requested data through the visualization. In turn, the app 114 may display the visualized data to the client device 110.

Figure 4:
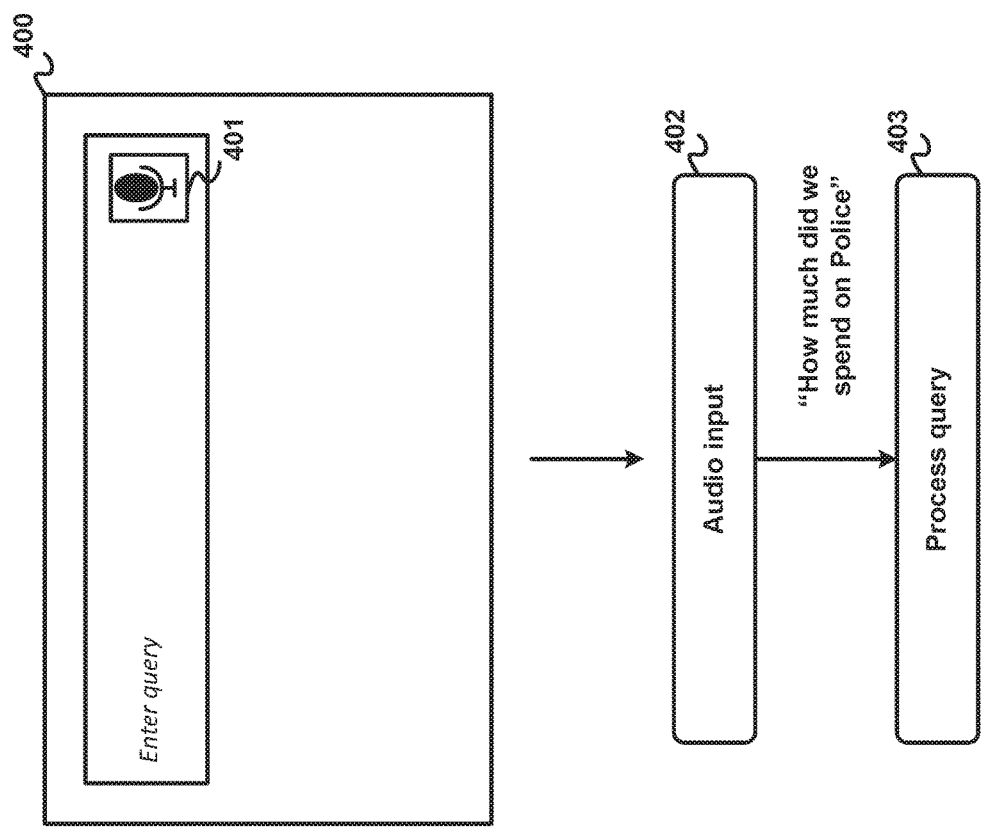
FIG. 4 illustrates a use-case example for processing audio input corresponding to a query, according to one embodiment

FIG. 4 illustrates a use-case example for processing audio input corresponding to a query, according to one embodiment. In particular, FIG. 4 depicts a user interface 400 that receives audio input corresponding to a query. In this example, assume that the user interface 400 is of the app 114 that accesses the financial transparency application 107 and query service 109. The user may press the microphone icon 401 to activate the microphone device in the client device 110. Once activated, the user may provide audio input to the app 114 (at 402). The app 114 receives the audio input from the microphone device and may, e.g., save the audio input as a sound file for transmitting to the query service 109.

In this example, assume that the audio input corresponds to a natural language query of "How much did we spend on Police." The query service 109 may process the natural language query (at 403) to generate a corresponding database query and suitable visualization of the data resulting from the query.

Figure 5:
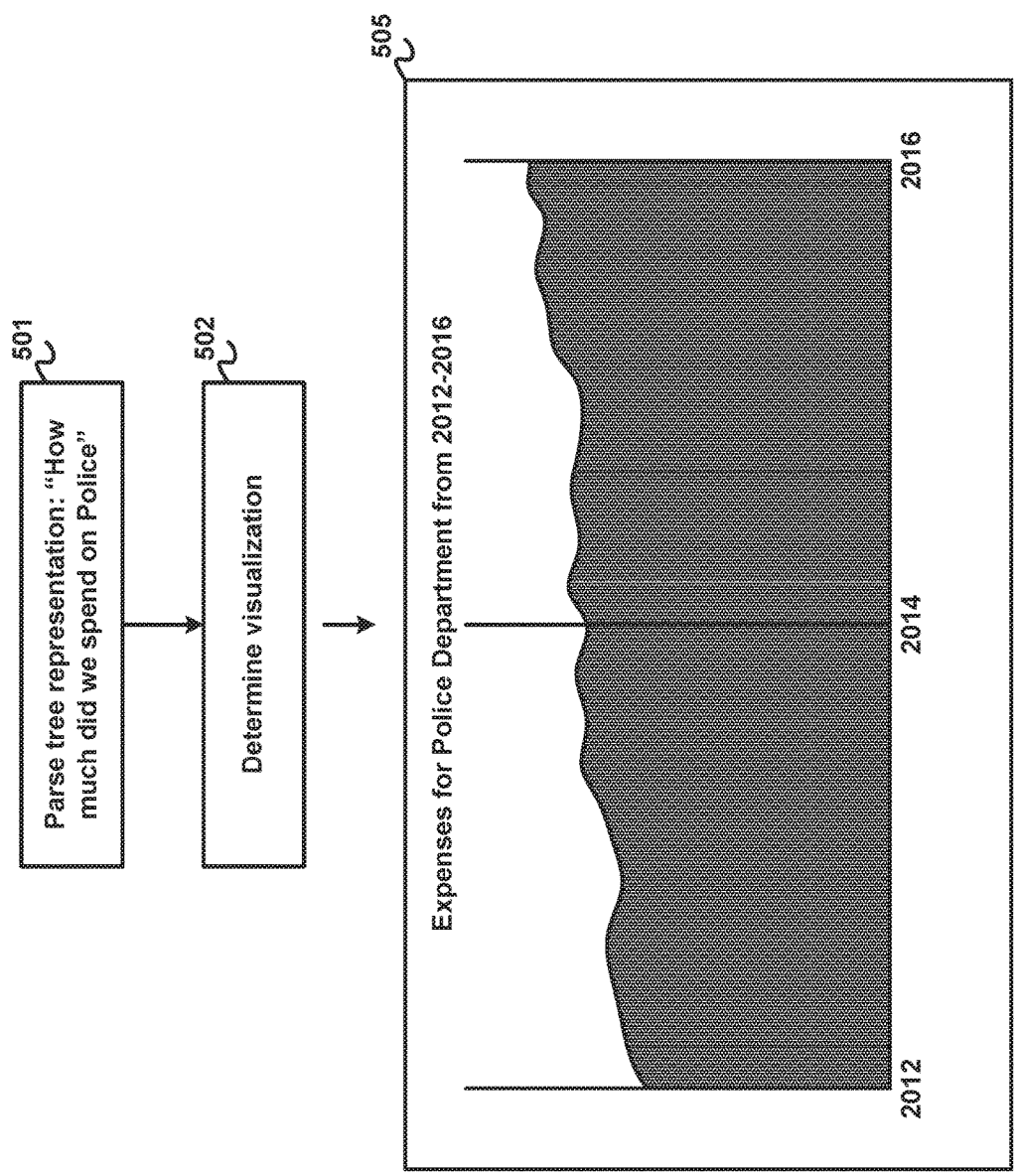
FIG. 5 illustrates a use-case example for presenting a visualization in response to audio input corresponding to a query, according to one embodiment.

FIG. 5 illustrates a use-case example for presenting a visualization in response to audio input corresponding to a query, according to one embodiment. In particular, FIG. 5 depicts the resulting visualization from the query introduced in FIG. 4. At 501, the evaluation component 215 generates a syntax parse tree representation of the natural language query "How much did we spend on Police." Doing so allows the evaluation component 215 to identify grammatical components in the natural language query and also identify relationships between the components.

In this example, the evaluation component 215 may identify Police as a target object in the query for the verb "spend," and the phrase "How much" as indicating a request for an aggregate amount. The evaluation component 215 may determine, based on context, that "Police" corresponds to a "Police Department" hierarchy in the data store 118. Once relationships between the grammatical components are identified, the evaluation component 215 maps the grammatical components to corresponding database components. The query service 109 may execute the query and retrieve a result data set from the data service 117.

At 502, the visualization component 502 determines the appropriate visualization to present the resulting data, e.g., by evaluating a query type to identify an expected form of response to the query. In this case, the natural language query provides no specific time period for spending in the Police Department, so by default, the visualization component 502 may determine to provide time series data corresponding to spending over a given period of time, such as between the years of 2012-2016. FIG. 5 depicts the resulting visualization in graph 505.

Figure 6:
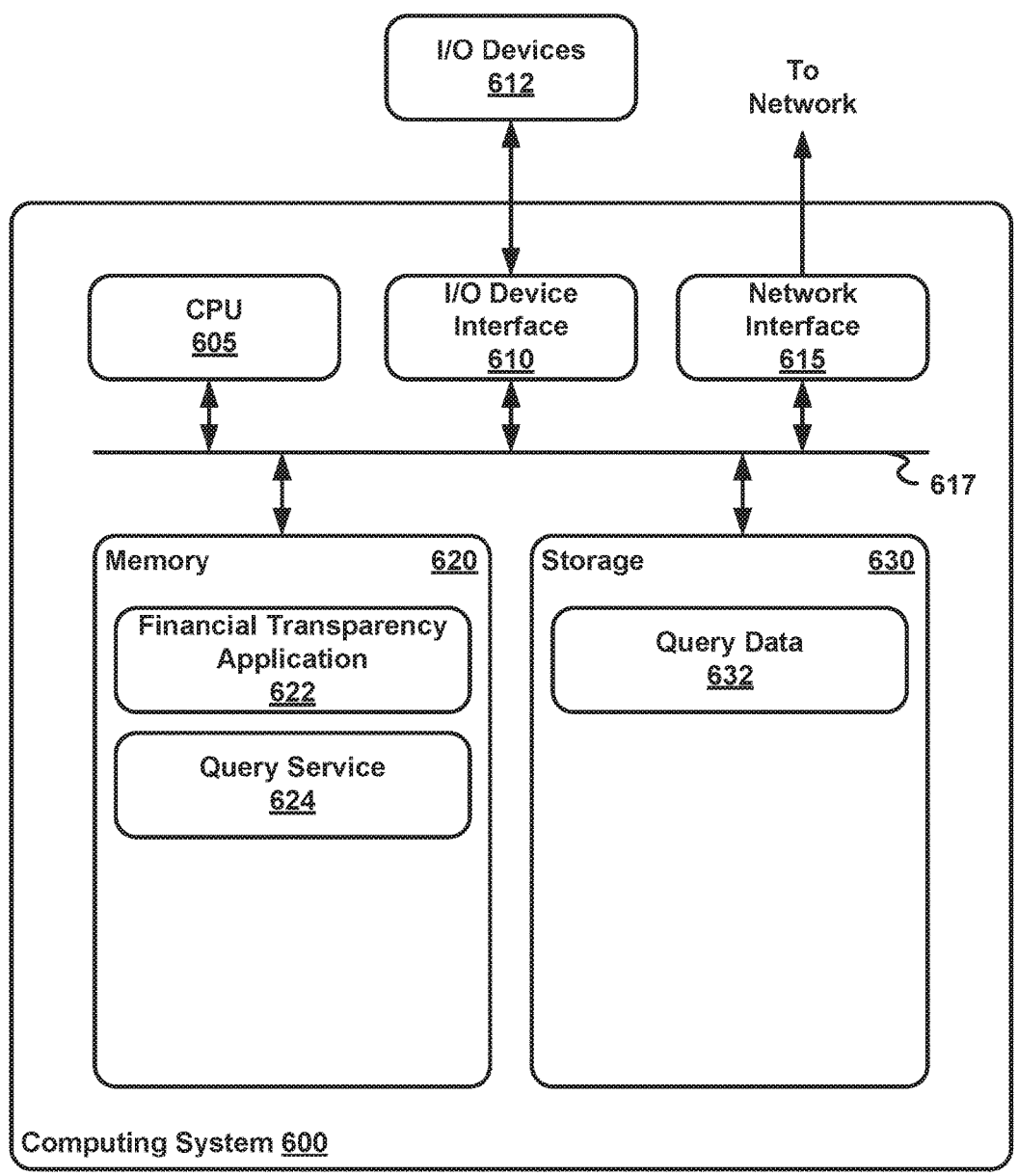
FIG. 6 illustrates an example computing system configured to resolve a query received as audio input, according to one embodiment.

FIG. 6 illustrates an example computing system 600 configured to resolve a query received as audio input, according to one embodiment. As shown, the computing system 600 includes, without limitation, a central processing unit (CPU) 605, an I/O device interface 614, which may allow for the connection of various I/O devices 612 (e.g., keyboards, displays, mouse devices, pen input, etc.) to the computing system 600, network interface 615, a memory 620, storage 630, and an interconnect 617.

CPU 605 may retrieve and execute programming instructions stored in the memory 620. Similarly, the CPU 605 may retrieve and store application data residing in the memory 620. The interconnect 617 transmits programming instructions and application data, among the CPU 605, I/O device interface 610, network interface 615, memory 620, and storage 630. CPU 605 is included to be representative of a single CPU, multiple CPUs, a single CPU having multiple processing cores, and the like. Additionally, the memory 620 is included to be representative of a random access memory. Furthermore, the storage 630 may be a solid state or disk drive. Although shown as a single unit, the storage 630 may be a combination of fixed and/or removable storage devices, such as fixed disc drives, removable memory cards or optical storage, network attached storage (NAS), or a storage area-network (SAN). In some cases, computing system 600 may be a single physical system or a distributed system, such as in one or more computer systems or data centers, with processing capabilities, memory 620, and storage 630 distributed across multiple computer systems.

As shown, memory 630 includes a financial transparency application 622 and a query service 624. The storage 630 includes query data 632. The financial transparency application 622 provides views of financial and budgetary data for municipal governments, typically scraped from public sources, such as charts of accounts corresponding to each of the governments. For example, the financial transparency application 622 identifies hierarchies in the budgetary, such as relationships between departments and funds detailed in the charts of accounts. The financial transparency application 622 also generates views (visualizations) of data for presenting to a requesting client on a user interface.

In one embodiment, the query service 624 receives audio input from client devices accessing the financial transparency application 622. The audio input corresponds to a natural language query requesting a set (or subset) of the budgetary data. The query service 624 may convert the audio input to corresponding text input and generate a syntax parse tree representing the lexicographical structure of the natural language query. The query service 624 classifies components in the structure of the syntax parse tree. Doing so allows the query service 624 to formulate a database query readable by a data service maintaining the budgetary data.

The query service 624 may execute the database query to retrieve the requested set of data. Further, the query service 624 determines a cardinality of the resulting data to determine how the resulting data should be displayed, such as whether the data should be presented as a time series graph, comparison graph, aggregation, and the like. The query service 624 may also determine how the resulting data should be displayed based on an evaluation of the query type and how the query is structured. Once determined, the financial transparency application 622 may generate a visualization conforming to the determination. The visualization includes the data responsive to the request.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for resolving a natural language query, the method comprising:
   receiving an audio query, via a user interface, requesting a set of data from a hierarchy;
   generating a syntax parse tree that separates the audio query into a set of grammatical components;
   assigning a type of part-of-speech tag to each respective grammatical component in the set of grammatical components;
   identifying a mapping of a part-of-speech tag to the hierarchy;
   generating, based on the mapping, a database query corresponding to the audio query;
   executing the database query;
   receiving the set of data responsive to the database query;
   determining, based on a natural language analysis of the audio query, a query type of the audio query;
   identifying a visualization type based on the determined query type; and
   displaying, via the user interface, a visualization based on the visualization type, wherein the displayed visualization includes the requested set of data from the hierarchy.

2. The method of claim 1, further comprising: converting the audio query to a text input.

3. The method of claim 1, wherein the query type includes at least one of a time series query, a comparison query, and an aggregate query.

4. The method of claim 1, wherein the visualization includes at least one of a time series graph, a pie chart, and a line graph.

5. The method of claim 1, further comprising:
prior to receiving the audio query, retrieving data from a public source; and
processing the data to identify the hierarchy in the data retrieved.

6. A non-transitory computer-readable storage medium storing instructions, which, when executed on one or more processors, performs an operation for resolving a natural language query, the operation comprising:
receiving an audio query, via a user interface, requesting a set of data from a hierarchy;
generating a syntax parse tree that separates the audio query into a set of grammatical components;
assigning a type of part-of-speech tag to each respective grammatical component in the set of grammatical components;
identifying a mapping of a part-of-speech tag to the hierarchy;
generating, based on the mapping, a database query corresponding to the audio query;
executing the database query;
receiving the set of data responsive to the database query;
determining, based on a natural language analysis of the audio query, a query type of the audio query;
identifying a visualization type based on the determined query type; and
displaying, via the user interface, a visualization based on the visualization type, where the displayed visualization includes the requested set of data from the hierarchy.

7. The non-transitory computer-readable storage medium of claim 6, wherein the operation further comprises: converting the audio query to a text input.

8. The non-transitory computer-readable storage medium of claim 6, wherein the query type includes at least one of a time series query, a comparison query, and an aggregate query.

9. The non-transitory computer-readable storage medium of claim 6, wherein the visualization includes at least one of a time series graph, a pie chart, and a line graph.

10. The non-transitory computer-readable storage medium of claim 6, further comprising:
prior to receiving the audio query, retrieving data from a public source; and
processing the data to identify the hierarchy in the data retrieved.

11. A system, comprising:
one or more processors; and
a memory storing program code, which, when executed on the one or more processors, performs an operation for resolving a natural language query, the operation comprising:
receiving an audio query, via a user interface, requesting a data from a hierarchy;
generating a syntax parse tree that separates the audio into a set of grammatical components;
assign a type of part-of-speech tag to each respective grammatical component in the set of grammatical components;
identifying a mapping of a part-of-speech tag to the hierarchy;
generating, based on the mapping, a database corresponding to the audio;
executing the database query;
receiving the set of data responsive to the database query;
determining, based on a natural language analysis of the audio query, a query type of the audio query;
identifying a visualization type based on the determined query type; and
displaying, via user interface, a visualization based on the visualization type, where the displayed visualization includes the requested set of data from the hierarchy.

12. The system of claim 11, wherein the query type includes at least one of a time series query, a comparison query and an aggregate query.

13. The system of claim 11, wherein the visualization includes at least one of a time series graph, a pie chart, and a line graph.

14. The system of claim 11, further comprising:
prior to receiving the audio query, retrieving data from a public source; and
processing the data to identify the hierarchy in the data retrieved.

15. The system of claim 11, wherein the operation further comprises: converting the audio query to a text input.

* * * * *